(12) United States Patent
Tarumoto

(10) Patent No.: US 6,421,125 B1
(45) Date of Patent: Jul. 16, 2002

(54) DEVICE AND METHOD FOR DETERMINING COMPATIBLE COLORS

(76) Inventor: Masahiro Tarumoto, 11-34 Higashiyama-cho, Ashiya-shi, Hyogo-Ken (JP), 659-0091

(*) Notice: Subject to any disclaimer, the term of this patent is extended or adjusted under 35 U.S.C. 154(b) by 231 days.

(21) Appl. No.: 09/589,524

(22) Filed: Jun. 7, 2000

Related U.S. Application Data

(63) Continuation-in-part of application No. 09/330,761, filed on Jun. 11, 1999, now abandoned.

(51) Int. Cl.[7] .................. G01J 3/52; G09B 19/00
(52) U.S. Cl. ........................ 356/421; 434/103
(58) Field of Search ............... 356/421, 422, 356/423, 425; 434/81, 99, 101, 102, 103, 104, 105; 283/113, 114

(56) References Cited

U.S. PATENT DOCUMENTS

| | | | |
|---|---|---|---|
| 1,308,512 A | | 7/1919 | Taylor |
| 1,467,032 A | | 9/1923 | Florence |
| 1,564,743 A | | 12/1925 | Adler |
| 4,112,594 A | * | 9/1978 | Impastato .............. 356/423 |
| 4,337,046 A | * | 6/1982 | Anderson et al. ........ 283/115 |
| 4,561,850 A | | 12/1985 | Fabbri et al. |
| 5,311,293 A | | 5/1994 | MacFarlane et al. |
| 5,313,267 A | * | 5/1994 | MacFarlane et al. ...... 356/405 |

FOREIGN PATENT DOCUMENTS

JP 1859699 7/1994

* cited by examiner

Primary Examiner—Frank G. Font
Assistant Examiner—Zandra Smith
(74) Attorney, Agent, or Firm—Robert E. Howard

(57) ABSTRACT

A set of color gages for assisting in selecting harmonious color combinations in accordance with those found in nature and the method of using such gages. In nature all colors can be classified into one of three groups called Solis, Aero and Aqua. All colors within each one of these three groups are compatible with each other, i.e., appear harmonious to the human eye. In addition, Aero colors are compatible with either Solis or Aqua colors. Solis and Aqua colors are not compatible. The gages are preferably circular, and contain a plurality of colored segments. The colored segments of the color gages are Solis, Aero, and Aqua versions of each of the six colors red, pink, yellow, green, purple, white, brown, and blue, with the exception of Aqua Brown and Solis Blue since these colors do not appear in nature. The colored segments can be compared to a selected dominant color to determine which of the three groups the dominant color belongs, and to determine which group's colors should be selected in order to achieve harmonious color combinations in accordance with natural principles.

11 Claims, 5 Drawing Sheets

COLOR DISTRIBUTIONS OF RED FLOWERS

Flowers In Red

Flowers In Red

Flowers In Red

DEVICE AND METHOD FOR DETERMINING COMPATIBLE COLORS

CROSS-REFERENCE TO RELATED APPLICATIONS

This is a continuation-in-part of application Ser. No. 09/330,761, filed Jun. 11, 1999 now abandonded.

BACKGROUND OF THE INVENTION

This invention relates to a device and method for determining compatible colors in accordance with harmonious color combinations appearing in nature.

Various methods and devices have been suggested in the prior art for determining harmonious color combinations.

Some such devices involve determining proper color combinations based on the solar spectrum associated with the chromatic musical scale. See, for example, U.S. Pat. Nos. 1,308,512, 1,467,032, and 1,564,743.

Other devices have been proposed for use in selecting compatible colors for cosmetic purposes. See, for example, U.S. Pat. Nos. 4,561,850 and 5,311,293.

Japanese Patent No. 1859699 issued to the present inventor on Jul. 27, 1994, describes a color matrix chart divided into four zones by an x and y axis with a first zone containing yellow and harmonious colors, the second zone containing red and harmonious colors, the third zone containing green and harmonious colors, and the fourth zone containing blue and harmonious colors. A fifth zone, called the central zone, is located at the juncture of the x and y axes, and contains colors which are in harmony with the colors in all four of the other zones. The yellow and red zones contain colors which stimulate excitement and the green and blue zones contain colors which are sedative. The colors are selected in accordance with what appears to the human eye to be visually harmonious.

All such schemes for selecting harmonious colors are based on human input, and do not provide color combinations pleasing to everyone.

It has been observed that color combinations found in nature, such as in flowers and other plants, are always pleasing to the human eye, and are therefore superior to manmade color harmony systems.

It is an object of this invention to provide a device for capturing nature's harmonious color combinations to thereby make it easier and more reliable to select color combinations in accordance with natural color selection.

SUMMARY OF THE INVENTION

The invention is a set of color gages used for selecting, or teaching how to select, harmonious colors in accordance with those found in nature.

It has been found that in nature there are eight basic colors found in plants, the colors being red, pink, yellow, green, purple, white, brown, or blue. It has also been found that the different colors and different shades or hues of each such color may be placed into one of three groups called Aero, Solis, or Aqua, based upon the appearance of such colors together in nature.

The gages contain a plurality of colored segments, the segments representing the Aero, Solis, and Aqua versions of each color, with the exception of Aqua Brown and Solis Blue which are not found in nature.

Preferably the gages are circular, and preferably each gage contains segments representing the Aero, Aqua and/or Solis versions of two colors.

DESCRIPTION OF PREFERRED EMBODIMENTS

Plants contain a variety of harmonious colors. To a human observer, such color combinations always appear harmonious.

A flower, for example, has a variety of colors on its petals, stamen, pistil, sepal, stalk, and leaves, all of which are harmonious with one another. It has been found by the present inventor that an average of fifty colors can be found in each flower. The present inventor has examined over ten thousand kinds of flowers, whose colors were analyzed and classified. From all these observations and analyses, the inventor has been found that the colors contained in every flower follows certain general rules which can be used to create a set of color gages for use in selecting naturally harmonious color combinations.

It has been found that all the colors found in the plants investigated can be divided into three groups. The inventor calls these three groups "Aero", "Solis", and "Aqua", named after "air", "sun", and "water", respectively. There are red/pink colors in all three groups; there are yellow/green colors in all three groups; and there are purple/white colors in all three groups. However, it has been determined that there is no Aqua Brown and no Solis Blue.

It has been found that nature uses combinations of all colors within each one of these three groups, i.e., such combinations are naturally harmonious and compatible.

It has also been found that nature uses combinations of Aero colors with either Solis or Aqua colors.

However, it has been found that Solis and Aqua colors are incompatible in nature; fewer than three percent of the ten thousand plants examined had such combinations.

The tropical water lily is exemplary of plants that are composed of all Aero colors.

The hibiscus plant is exemplary of plants that are composed of all Solis colors.

The bougainvillea plant is exemplary of plants that are composed of all Aqua colors.

Figure 1:
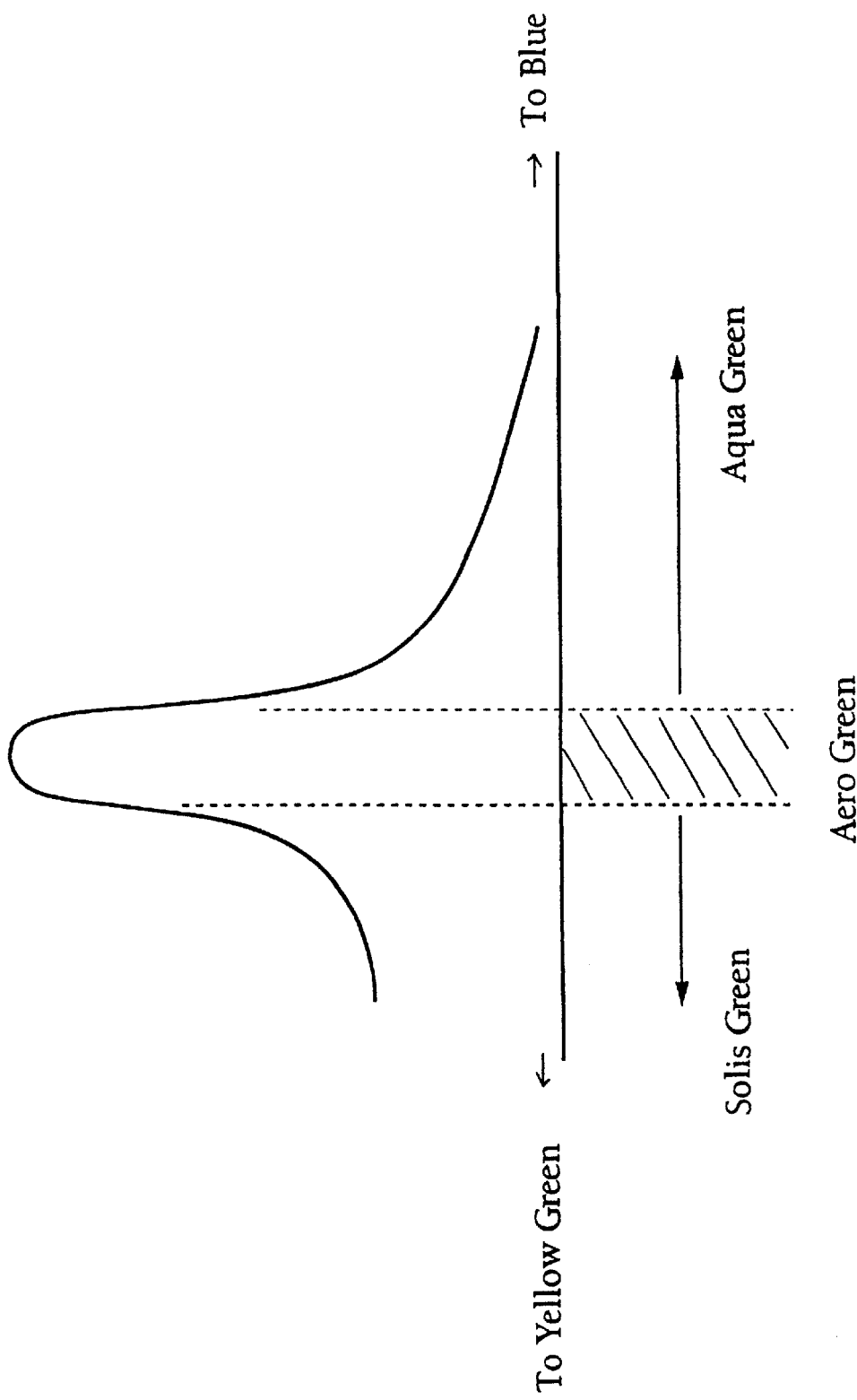
FIG. 1 is a graph showing the distribution of hues of green in plant leaves.
Figure 2:
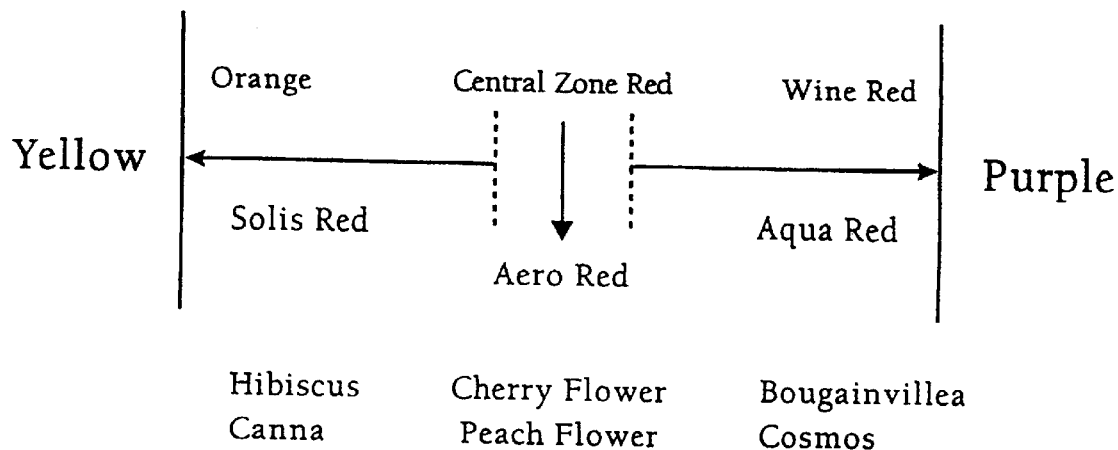
FIG. 2 is a chart showing the color distributions of red flowers.
Figure 3:
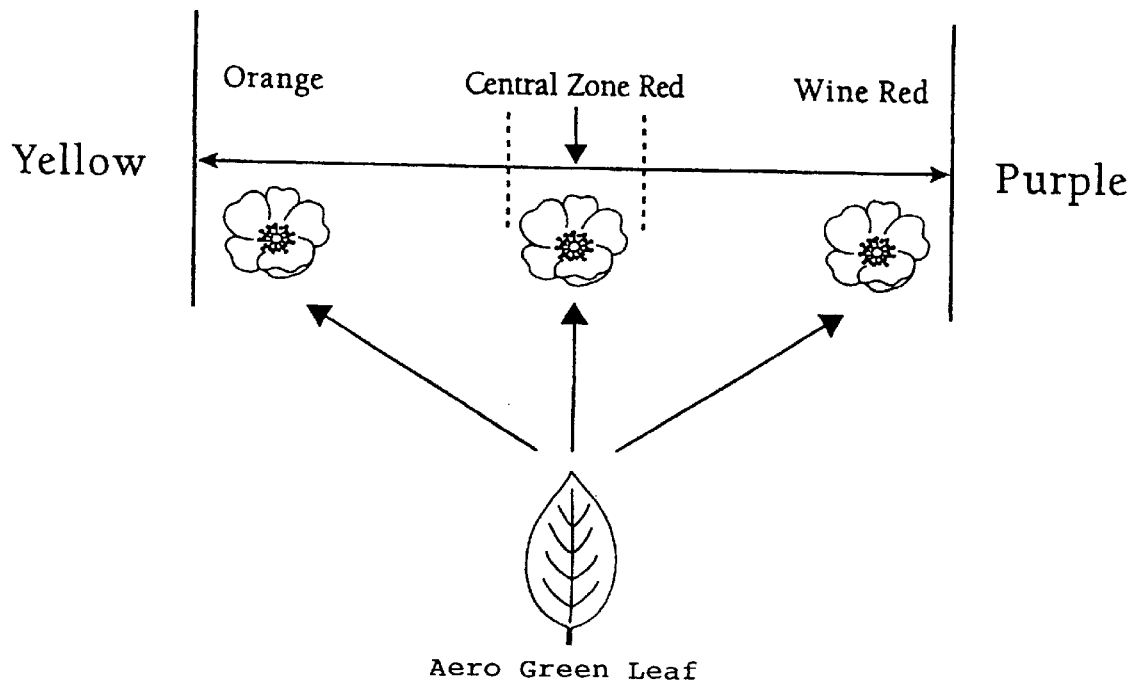
FIG. 3 is a chart showing the range of red hues harmonious with an Aero Green leaf.
Figure 4:
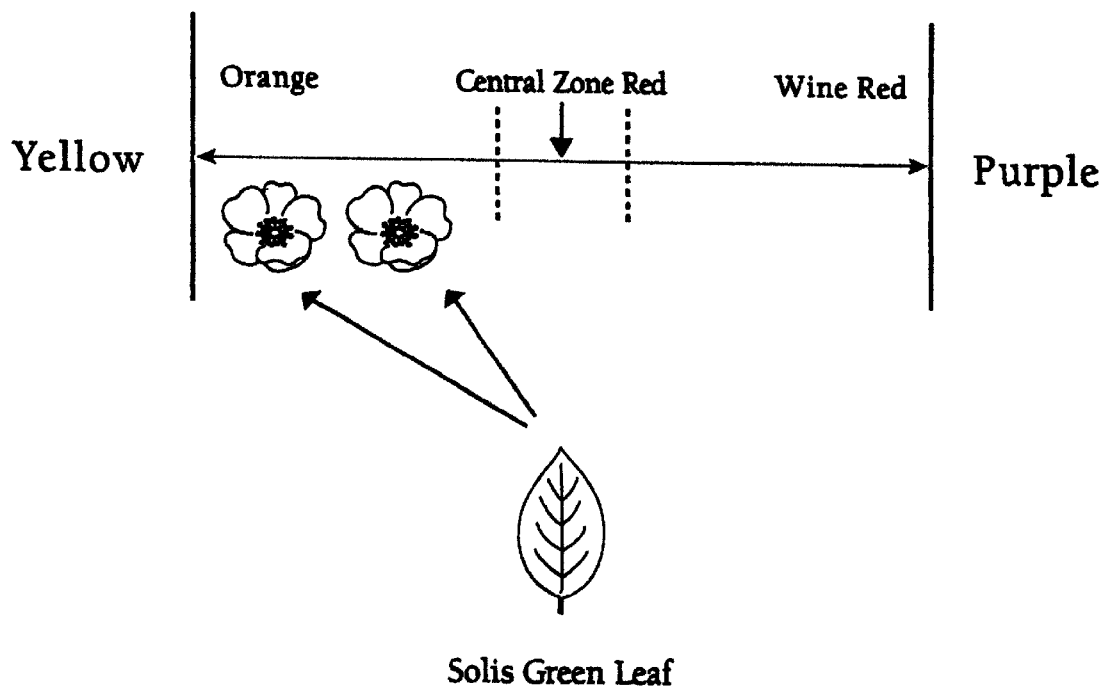
FIG. 4 is a chart showing the range of red hues harmonious with a Solis Green leaf.
Figure 5:
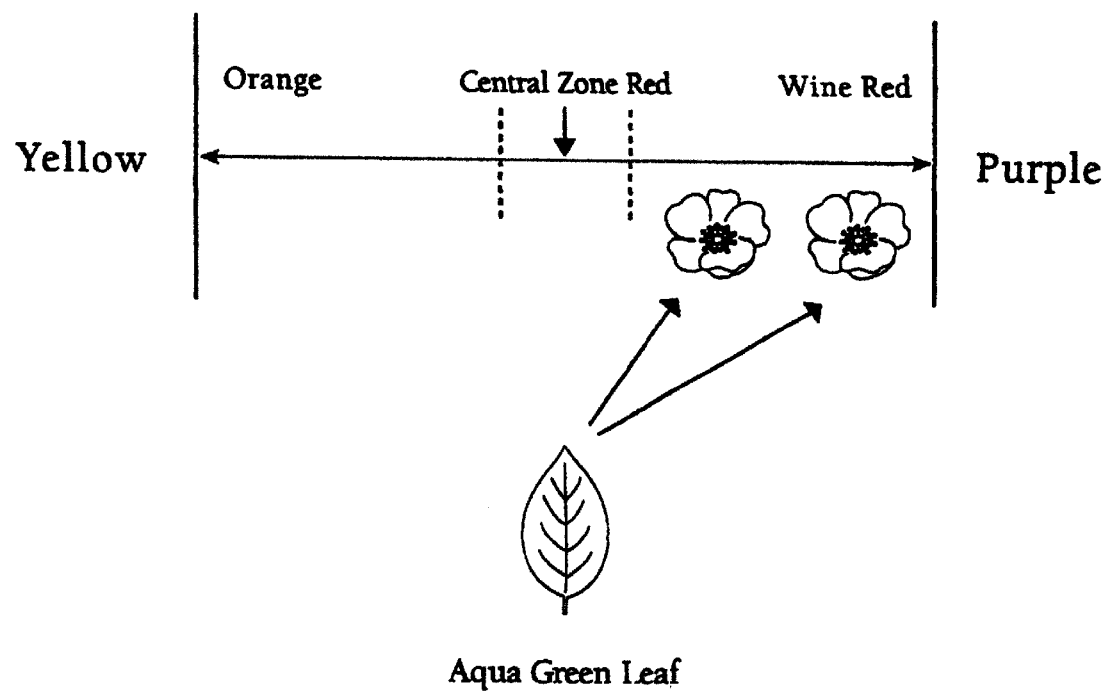
FIG. 5 is a chart showing the range of red hues harmonious with an Aqua Green leaf.
Figure 6:
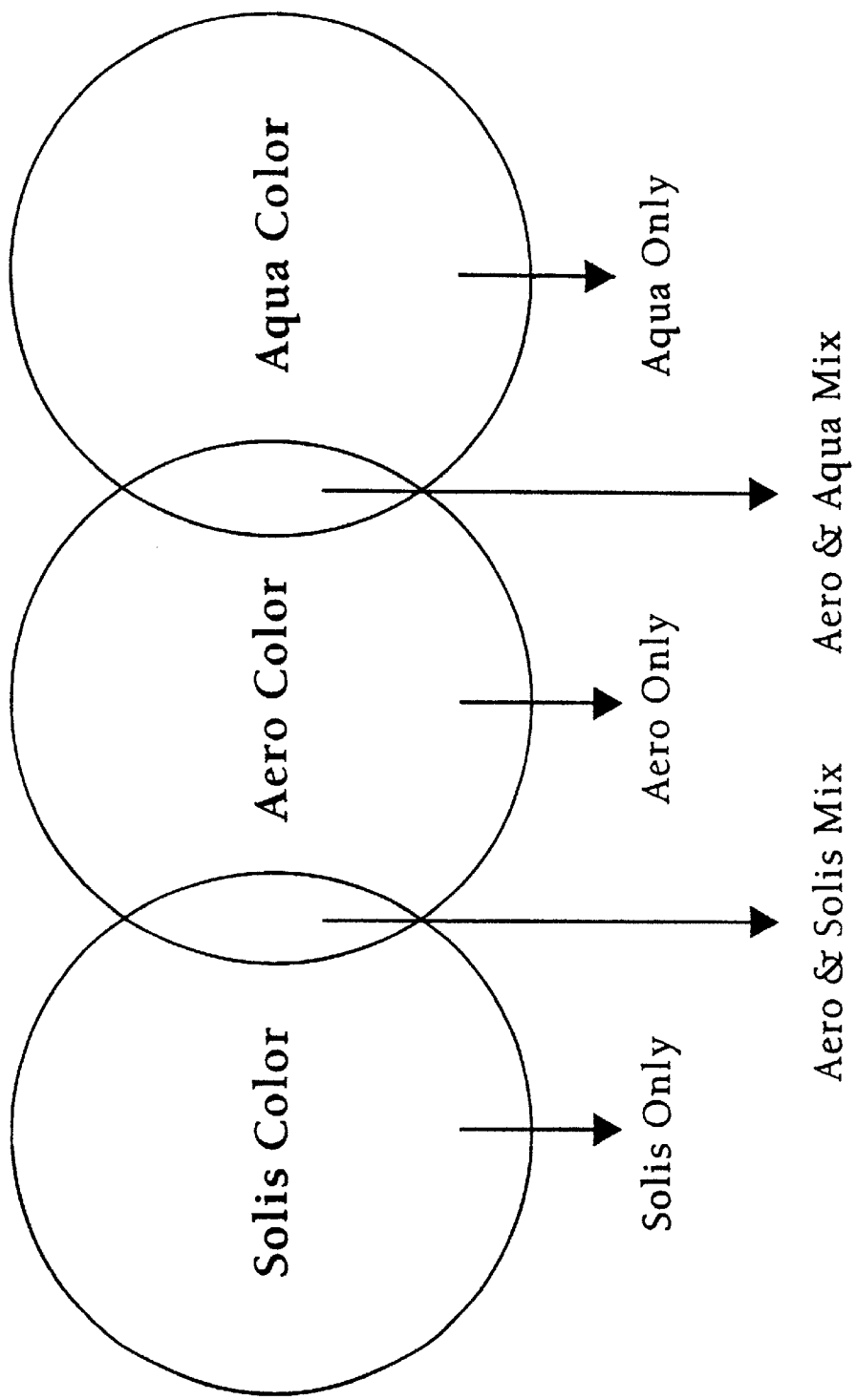
FIG. 6 is a chart showing harmonized color mixes.

The pivotal color in nature is the green color of the plant leaf. The green hues of the leaves of plants are distributed between yellow green hues and blue hues. In this invention it has been found that the distribution of the green hues of plant leaves are predominantly in a particular part of the range of the green hue zone. The phrase "Green of Aero Color" (hereinafter called "Aero Green") signifies the green hue range in which the green color for plant leaves predominates. The hues of green constituting Aero Green comprises over 50% of the green hues found in plants in nature, as illustrated in FIG. 1. For example, the hues of green of the leaves of pine trees, cherry trees, plum trees, dandelions, rice plants, and camellias are all in the Aero Green zone.

Because humans have throughout history seen the green hues of Aero Green more frequently, we have become familiar with the greens falling within the Aero Green range the most.

All the green hues between the Aero Green zone and the yellow green hue area are called "Solis Green", as seen in FIG. 1. The relationship between Aero Green and Solis Green is also illustrated in FIG. 1. The horizontal axis shows the extent of green hues between yellow green and blue green. The vertical axis shows the frequency of the number of the various green hues of leaves in nature.

The hues of green of Aqua color (hereinafter called "Aqua Green") are those that fall in the range between the Aero Green zone and the blue green area, as shown in FIG. 1.

Research was conducted on the relationship between the color of a flower and the color of the leaves associated with that flower.

In terms of red, it was found that the red hue on each flower is related to the green hue of its associated leaf. Plants having leaves that are colored Aero Green have flowers that have unique red hues that are hereinafter called "Aero Red". Aero Red hues do not appear on the flowers of plants with leaves that are Solis Green or Aqua Green, as illustrated in FIGS. 2–5. In other words, Aero Red is found only on the flowers of plants having leaves that are Aero Green.

The hues of Solis Red fall in the color range between Aero Red and yellow.

The hues of Aqua Red fall in the color range between Aero Red and purple.

In terms of yellow, it was found that the yellow hue on each flower is related to the green hue of its associated leaf. Plants having leaves that are colored Aero Green have flowers that have unique yellow hues that are hereinafter called Aero Yellow. Aero Yellow hues do not appear on the flowers of plants with leaves that are Solis Green or Aqua Green. In other words, Aero Yellow hues appear only on the flowers of plants having leaves that are Aero Green.

The hues of Solis Yellow fall in the color range between Aero Yellow and orange.

The hues of Aqua Yellow fall in the color range between Aero Yellow and yellow green.

By "yellow green" is meant the group of colors that comes under the particular hue zone where over 50% of the plant's leaf is yellow green. Plants having leaves that are colored Aero Green have flowers that have unique yellow green hues that are hereinafter called Aero Yellow Green. Aero Yellow Green hues do not appear on the flowers of plant with leaves that are Solis Green or Aqua Green. In other words, Aero Yellow Green hues appear only on the flowers of plants having leaves that are Aero Green.

The hues of Solis Yellow Green fall in the color range between Aero Yellow Green and yellow.

The hues of Aqua Yellow Green fall in the color range between Aero Yellow Green and green.

Pink is a light shade of red. Therefore, light shades of Aero Red, Solis Red, and Aqua Red are equal to Aero Pink, Solis Pink, and Aqua Pink, respectivley.

In terms of purple, it was found that the purple hue on each flower is related to the green hue of its associated leaf. Plants having leaves that are colored Aero Green have flowers that have unique purple hues, hereinafter called Aero Purple. Aero Purple hues do not appear on the flowers of plants with leaves that are Solis Green or Aqua Green. In other words, Aero Purple hues appear only on the flowers of plants having leaves that are Aero Green.

The hues of Solis Purple fall in the color range between Aero Purple and red.

The hues of Aqua Purple fall in the color range between Aero Purple and blue.

In terms of white, it was found that the white hue on each flower is related to the green hue of its associated leaf. Plants having leaves that are colored Aero Green have flowers that have unique white hues that are hereinafter called Aero White. Aero White hues do not appear on the flowers of plants with leaves that are Solis Green or Aqua Green. In other words, Aero White hues appear only on the flowers of plants having leaves that are Aero Green.

The hues of Solis White come from the flowers of plants with Solis Green leaves.

The hues of Aqua White come from the flowers of plants with Aqua Green leaves.

In terms of black, Aero Black, Solis Black, and Aqua Black come from the flowers of plants with Aero Green, Solis Green, and Aqua Green leaves, respectively.

Gray is a lighter color of black, and Aero Gray, Solis Gray, and Aqua Gray similarly come from the flowers of plants with Aero Green, Solis Green, and Aqua Green leaves, respectively.

In terms of blue, it was found that the blue hues followed a slightly different pattern than other colors. The flowers of plants having leaves that are colored either Aero Green or Solis Green have unique blue hues that are hereinafter called Aero Blue.

Hues of Aqua Blue fall in the color range between Aero Blue and purple.

Solis Blue does not exist in nature.

Brown hues also follow a slightly different pattern. The flowers of plants having leaves that are colored either Aero Green or Aqua Green have unique brown hues that are hereinafter called Aero Brown.

All browns except Aero Brown are Solis Brown.

Aqua Brown does not exist in nature.

In accordance with the present invention it has been found that harmonious color combinations, like those appearing in nature, can be selected by using one of the following rules:

1. Use colors composed of only Aero colors.
2. Use colors composed of only Solis colors.
3. Use colors composed of only Aqua colors.
4. Use colors selected only from Aero and Solis colors.
5. Use colors selected only from Aero and Aqua colors.
6. Avoid combinations containing both Solis and Aqua colors.

Color combinations selected other than in accordance with the foregoing rules will be perceived as unnatural and not a harmonious color mix by a majority of people.

The color gages of this invention enables the user to create harmonious color combinations in accordance with those found in nature, which are inherently pleasing to the human eye. The color gages of this invention can also be used as a teaching device to illustrate such harmonious color combinations.

Figure 7:
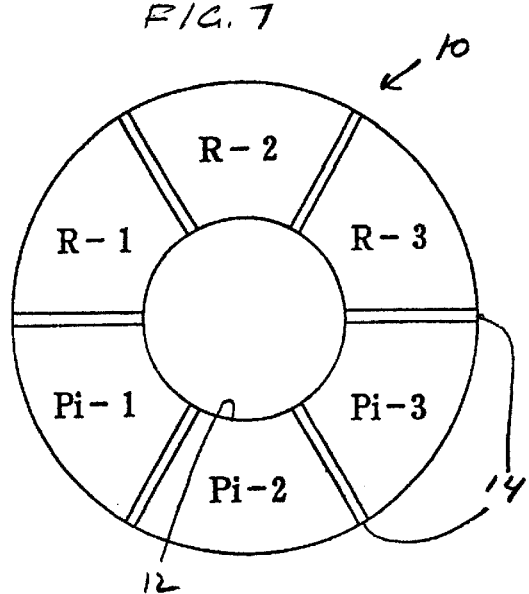
FIG. 7 is a front view of the red/pink color gage of the invention.

FIG. 7 illustrates the red/pink color gage 10 of this invention. Color gage 10 is divided into six segments, denoted in the drawing by reference numerals R-1, R-2, R-3, Pi-1, Pi-2, and Pi-3. Segment R-1 is colored Solis Red, segment R-2 is colored Aero Red, segment R-3 is colored Aqua Red, segment Pi-i is colored Solis Pink, segment Pi-2 is colored Aero Pink, and segment Pi-3 is colored Aqua Pink.

Figure 8:
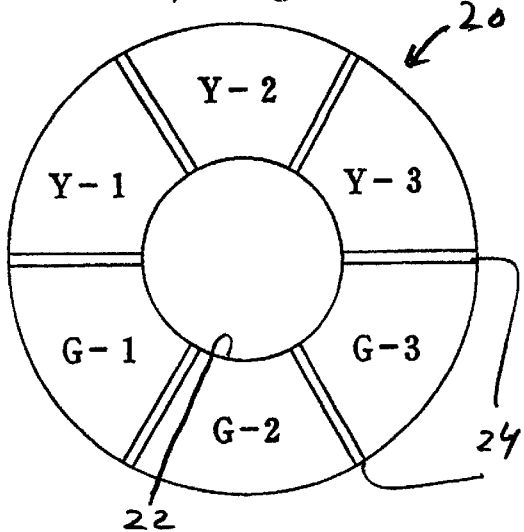
FIG. 8 is a front view of the yellow/green color gage of the invention.

FIG. 8 illustrates the yellow/green gage 20 of this invention. Color gage 20 is divided into six segments, Y-1, Y-2, Y-3, G-1, G-2, and G-3. Segment Y-1 is colored Solis Yellow, segment Y-2 is colored Aero Yellow, segment Y-3 is colored Aqua Yellow, segment G-1 is colored Solis Green, segment G-2 is colored Aero Green, and segment G-3 is colored Aqua Green.

Figure 9:
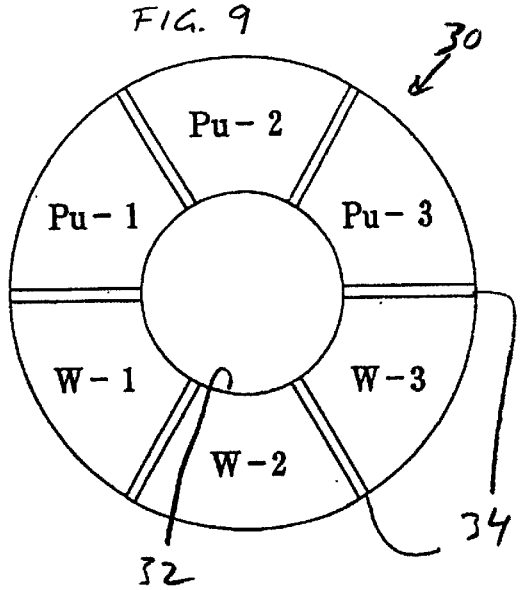
FIG. 9 is a front view of the purple/white gage of the invention.

FIG. 9 illustrates the purple/white gage 30 of this invention. Color gage 30 is divided into six segments, Pu-1, Pu-2, Pu-3, W-1, W-2, and W-3. Segment Pu-1 is colored Solis Purple, segment Pu-2 is colored Aero Purple, segment Pu-3 is colored Aqua Purple, segment W-1 is colored Solis White, segment W-2 is colored Aero White, and segment W-3 is colored Aqua White.

Figure 10:
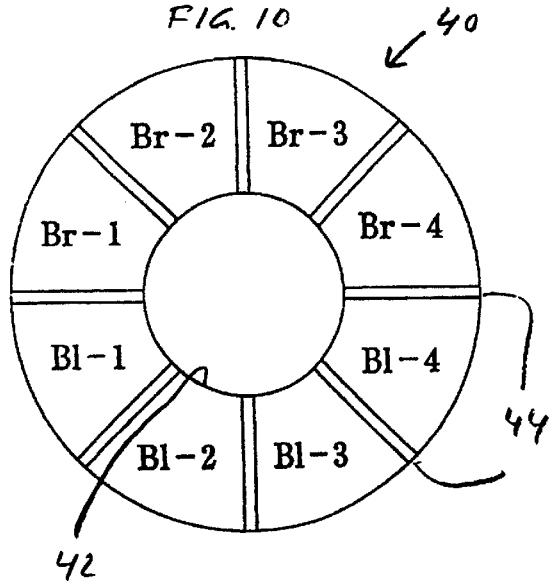
FIG. 10 is a front view of the brown/blue gage of the invention.

FIG. 10 illustrates the brown/blue gage of this invention. Color gage 40 is divided into eight segments, Br-1, Br-2, Br-3, Br-4, Bl-1, Bl-2, Bl-3, and Bl-4. Segments Br-1 and Br-2 are colored Solis Browns, segments Br-3 and Br-4 are colored Aero Browns, segments Bl-1 and Bl-2 are colored Aero Blues, and segments Bl-3 and Bl-4 are colored Aqua Blues. As mentioned above, there are no Aqua Browns and no Solis Blues in nature; therefore, none appear on the brown/blue gage of this invention.

The colors appearing on the four gages illustrated in FIGS. 7–10 can be defined in terms of the color code number of the Munsell Color System as follows:

In FIG. 7:
R-1 (Solis Red): 5R 4/14
R-2 (Aero Red): 10RP 4/14
R-3 (Aqua Red): 5RP 4/12
Pi-1 (Solis Pink): 5R 7/8
Pi-2 (Aero Pink): 10RP 7/8
Pi-3 (Aqua Pink): 5RP 7/8
In FIG. 8:
Y-1 (Solis Yellow): 10YR 8/10
Y-2 (Aero Yellow): 2.5 Y 8/10
Y-3 (Aqua Yellow): 7.5 Y 8/10
G-1 (Solis Green): 2.5 GY 4/6
G-2 (Aero Green): 7.5 GY 4/6
G-3 (Aqua Green): 2.5 G 4/6
In FIG. 9:
Pu-1 (Solis Purple): 10P 4/6
Pu-2 (Aero Purple): 7.5P 4/8
Pu-3 (Aqua Purple): 5P 4/8
W-1 (Solis White): 7.5 YR 9/1
W-2 (Aero White): 2.5YR 9/1
W-3 (Aqua White): 7.5B 9/1
In FIG. 10:
Br-1 (Solis Brown): 2.5YR 6/6
Br-2 (Solis Brown): 2.5YR 3/4
Br-3 (Aero Brown): 10 RP 3/4
Br-4 (Aero Brown): 10 RP 6/4
Bl-1 (Aero Blue): 2.5PB 6/6
Bl-2 (Aero Blue): 2.5PB 4/8
Bl-3 (Aqua Blue): 7.5PB 3/10
Bl-4 (Aqua Blue): 5PB 6/8

In a preferred embodiment, color gages 10, 20, 30, and 40 are circular, the gages having circular openings 12, 22, 32, and 42 located centrally therein, respectively, as shown. The various colored segments extend from the periphery of each circular opening 12, 22, 32, or 42 to the periphery of the respective gage 10, 20, 30, or 40. Each segment contained on gages 10, 20, 30, and 40 is separated from each adjacent segment by narrow white lanes 14, 24, 34, and 44, respectively.

In use, a designer wishing to select compatible colors for any purpose, such as interior decoration, industrial designs, etc., would select a dominant color with which other colors are to be used, it being desired to select such other colors to be in a harmonious relationship with the dominant color and with each other in accordance with the natural color system described herein.

To accomplish this object, the designer would select the appropriate color gage of this invention to closely match the selected dominant color with one of the color segments. For example, if the dominant color selected by the designer is a green color, the designer would take the yellow/green gage 20 and see which of the greens G-1, G-2, or G-3 more closely approximates the green color he has selected. Once such a match is made, the designer can quickly determine if the green he has selected is a Solis Green, an Aero Green, or an Aqua Green.

Once this determination is made, the designer can select harmoniously compatible colors based upon the principles described herein. For example, if the designer wishes to use a red color in combination with the green he has selected, and the green he has selected is an Aero Green, he knows that the red he chooses should be an Aero Red, although it could also be either a Solis Red or an Aqua Red. However, if the designer has selected a Solis Green, he knows that he can use either a Solis Red or an Aero Red, but not an Aqua Red. Similarly, if the designer has selected an Aqua Green, he knows he can use either an Aqua Red or an Aero Red, but not a Solis Red.

The color gages 10, 20, 30, and 40 do not contain all the various shades of the various Solis, Aero, and Aqua colors. A chart for each of Solis colors, Aero colors, and Aqua colors are prepared, each chart containing various shades of each color, ranging from light to dark. In a preferred embodiment, each chart contains five shades of each color, white being represented by a single shade.

The shades selected for the color gages of the invention, except for the brown/blue gage, represent a "middle" shade for that color, i.e., a shade between the light and dark shades for that color. The brown/blue gage has no Aqua Brown and no Solis Blue, so a light brown and light blue shade for each of the Solis and Aero colors are added to that gage.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A set of color gages for use in selecting compatible color combinations in accordance with harmonious color combinations found in nature comprising:

a red/pink gage having three red colored segments and three pink colored segments,
said three red colored segments being comprised of one Solis Red colored segment, one Aero Red colored segment, and one Aqua Red colored segment, and said three pink colored segments being comprised of one Solis Pink colored segment, one Aero Pink colored segment, and one Aqua Pink colored segment;

a yellow/green gage having three yellow colored segments and three green colored segments,
   said three yellow colored segments being comprised of one Solis Yellow colored segment, one Aero Yellow colored segment, and one Aqua Yellow colored segment, and
   said three green colored segments being comprised of one Solis Green colored segment, one Aero Green colored segment, and one Aqua Green colored segment;

a purple/white gage having three purple colored segments and three white colored segments,
   said three purple colored segments being comprised of one Solis Purple colored segment, one Aero Purple colored segment, and one Aqua Purple colored segment, and
   said three white colored segments being comprised of one Solis White colored segment, one Aero White colored segment, and one Aqua White colored segment; and a brown/blue gage having four brown colored segments and four blue colored segments,
   said four brown colored segments being comprised of two Solis Brown colored segments and two Aero Brown colored segments, and
   said four blue colored segments being comprised of two Aero Blue colored segments and two Aqua Blue colored segments.

2. The set of color gages of claim 1 wherein each of said gages is circular.

3. The set of color gages of claim 2 wherein each of said circular gages has a concentric circular opening in the center of said circular gage, the colored segments of each of said circular gages extending from the periphery of said opening to the periphery of said circular gage.

4. The set of color gages of claim 1 wherein each of said segments is separated from adjacent segments by a space.

5. The set of color gages of claim 1 wherein the Solis, Aero, and Aqua colors of the red/pink, yellow/green, and purple/white gages are selected from a shade substantially midway between the light and dark shades of those colors.

6. The brown/blue color gage of claim 5 wherein one of each of the two Solis Brown and Solis Blue shades and one each of the two Aero Brown and Aero Blue shades are selected from a light shade of that color, the other Solis Brown and Solis Blue shades and the other Aero Brown and Aero Blue shades being selected from a shade substantially midway between the light and dark shades of those colors.

7. The set of color gages of claim 1 wherein the colored segments are the colors represented by the color code numbers of the Munsell Color System as follows:
   (a) said red/pink gage:
     Solis Red: 5R 4/14
     Aero Red: 10RP 4/14
     Aqua Red: 5RP 4/12
     Solis Pink: 5R 7/8
     Aero Pink: 10RP 7/8
     Aqua Pink: 5RP 7/8
   (b) said yellow/green gage:
     Sois Yellow: 10YR 8/10
     Aero Yellow: 2.5 Y 8/10
     Aqua Yellow: 7.5 Y 8/10
     Solis Green: 2.5 GY 4/6
     Aero Green: 7.5 GY 4/6
     Aqua Green: 2.5 G 4/6
   (c) said purple/white gage:
     Solis Purple: 10P 4/6
     Aero Purple: 7.5P 4/8
     Aqua Purple: 5P 4/8
     Solis White: 7.5 YR 9/1
     Aero White: 2.5YR 9/1
     Aqua White: 7.5B 9/1
   (d) said brown/blue gage:
     Solis Brown: 2.5YR 6/6
     Solis Brown: 2.5YR 3/4
     Aero Brown: 10 RP 3/4
     Aero Brown: 10 RP 6/4
     Aero Blue: 2.5PB 6/6
     Aero Blue: 2.5PB 4/8
     Aqua Blue: 7.5PB 3/10
     Aqua Blue: 5PB 6/8.

8. A compatible color selection package comprising:
   the set of color gages of claim 1;
   a Solis chart containing a plurality of shades of each of the red, pink, yellow, green, purple, white, and brown Solis colors;
   an Aero chart containing a plurality of shades of each of the red, pink, yellow, green, purple, white, brown and blue Aero colors; and
   an Aqua chart containing a plurality of shades of each of the red, pink, yellow, green, purple, white, and blue Aqua colors.

9. A compatible color selection package comprising:
   the set of color gages of claim 7;
   a Solis chart containing a plurality of shades of each of the red, pink, yellow, green, purple, white, and brown Solis colors;
   an Aero chart containing a plurality of shades of each of the red, pink, yellow, green, purple, white, brown and blue Aero colors; and
   an Aqua chart containing a plurality of shades of each of the red, pink, yellow, green, purple, white, and blue Aqua colors.

10. A process of selecting harmonious color combinations comprising:
   determining colors appearing together in a plurality of different kinds of plants;
   classifying said colors into three color groups, each color group containing colors found together in individual plants;
   preparing a set of color gages, each color gage containing at least one similar color of each of said three color groups;
   comparing said color gages with a selected first color with which it is desired to associate at least one other color harmonious therewith, and determining which of said three color groups said selected first color belongs; and
   selecting said other color from the same color group as said selected first color.

11. The process of claim 10 wherein said colors in each of said three color groups is selected from a first group consisting of red, pink, yellow, green, purple, white, and shades thereof, said colors in a first one of said three color groups is additionally selected from a second group consisting of brown and blue, the colors in a second one of said three color groups is additionally selected from brown, and the colors in a third one of said three color groups is additionally selected from blue.

* * * * *